(12) United States Patent
Black

(10) Patent No.: US 6,758,590 B1
(45) Date of Patent: Jul. 6, 2004

(54) EFFICIENT CONCRETE RECYCLING

(75) Inventor: Melvin L. Black, Pacifica, CA (US)

(73) Assignee: Melvin L. Black, Inc., Pacifica, CA (US)

( * ) Notice: Subject to any disclaimer, the term of this patent is extended or adjusted under 35 U.S.C. 154(b) by 94 days.

(21) Appl. No.: 10/085,415

(22) Filed: Feb. 26, 2002

Related U.S. Application Data
(60) Provisional application No. 60/271,547, filed on Feb. 26, 2001.

(51) Int. Cl.[7] .................................................. B28C 5/14
(52) U.S. Cl. ......................................... 366/64; 366/601
(58) Field of Search .......................... 366/2, 46, 64–67, 366/325.92, 325.93, 601; 388/921, 930; 318/452, 474, 476, 477, 484–487

(56) References Cited

U.S. PATENT DOCUMENTS

| | | | | |
|---|---|---|---|---|
| 3,456,179 A | * | 7/1969 | Joslin | 318/484 |
| 3,727,894 A | * | 4/1973 | Ahrenberg | 366/17 |
| 4,226,542 A | | 10/1980 | Black et al. | |
| 4,436,429 A | * | 3/1984 | Strong et al. | 366/2 |
| 4,488,815 A | | 12/1984 | Black | |
| 4,657,871 A | * | 4/1987 | Freakley et al. | 436/55 |
| 4,818,113 A | * | 4/1989 | Patel | 366/76.2 |
| 5,149,192 A | | 9/1992 | Hamm et al. | |
| 5,556,198 A | * | 9/1996 | Dickson et al. | 366/97 |
| 5,829,344 A | * | 11/1998 | Lande | 99/453 |
| 5,843,315 A | | 12/1998 | Baughn et al. | |
| 6,126,307 A | | 10/2000 | Black et al. | |
| 6,325,311 B1 | | 12/2001 | Preisser | |
| 6,341,889 B1 | * | 1/2002 | Noda et al. | 366/262 |

FOREIGN PATENT DOCUMENTS

WO  WO 96/28290  *  9/1996

* cited by examiner

Primary Examiner—Charles E. Cooley
Assistant Examiner—David Sorkin
(74) Attorney, Agent, or Firm—Beyer Weaver & Thomas, LLP

(57) ABSTRACT

A concrete plant with robust recycling capabilities and high energy efficiency is disclosed. In one aspect, a concrete recycling machine used at the concrete plant includes at least a slurry vessel that receives slurry provided from concrete being returned, a motor that drives an agitation device that agitates the slurry in the slurry vessel, and a control system that controls at least one of duration and frequency with which the motor drives the agitation device.

17 Claims, 11 Drawing Sheets

| (ENVIRO-MATIC) MODULES | FUNCTIONS | BENEFITS |
|---|---|---|
| Aggregates Reclaiming Module | Separates aggregates from slurry, washes, dewaters aggregates. Choice of models and capacities. | High quality construction by Stephens Mfg. produces long life, trouble-free performance. |
| Shaker Screen Module (optional) | Separates coarse and fine aggregates. | Reduces material handling costs. |
| Hydrocyclone Module (optional) | Strips sand fines (100+) from slurry on demand. Centrifugal flow device has no moving parts. | Maximizes recovery of fines. Reduces slurry density for better recycling or dewatering. |
| Slurry Vessel Module | Stores slurry for later recycling, dewatering or disposal. | Underground location saves space, permits dilution to control density. Agitators run on demand, use minimal power. |
| Density Cell Module | Measures specific gravity of slurry. | Ensures total quality control of concrete made with recycled slurry. |

*FIG. 4*

| | | |
|---|---|---|
| Solids Correction Programming Instruction Module | Powerful, proprietary software interfaces with batch plant control system, maintains yield, water/cement ratio and mix proportions regardless of slurry density | Protects quality of your product. Permits total recycling of slurry with no compromise in mix design. Works with all major computerized plant controls. Only the Enviro-Matic System has this vital quality control capability. |
| Cyclic Plate Filter Press Module (optional) | Simple, economical method of dewatering slurry when it cannot be recycled into new concrete. Range of sizes and capacities. | Completely eliminates any slurry problem. Supports extreme demands up to 150 cu. yd. per day of returned concrete. Solids are compressed into stable, solid cake byproduct easy to load, haul and dump as fill material. Filtrate water is clarified and reusable. |
| Continuous Belt Filter Press Module (optional) | Minimizes or eliminates need for extensive settling ponds. | |
| Drainage Containment Interface Module (optional) | All plant site storm drainage, fugitive water, filtrate, and make-up water can be prioritized by Enviro-Matic control. | Aids in compliance with regulations even with maximum production, adverse job conditions, high volumes of returned concrete and severe weather. |

*FIG. 5*

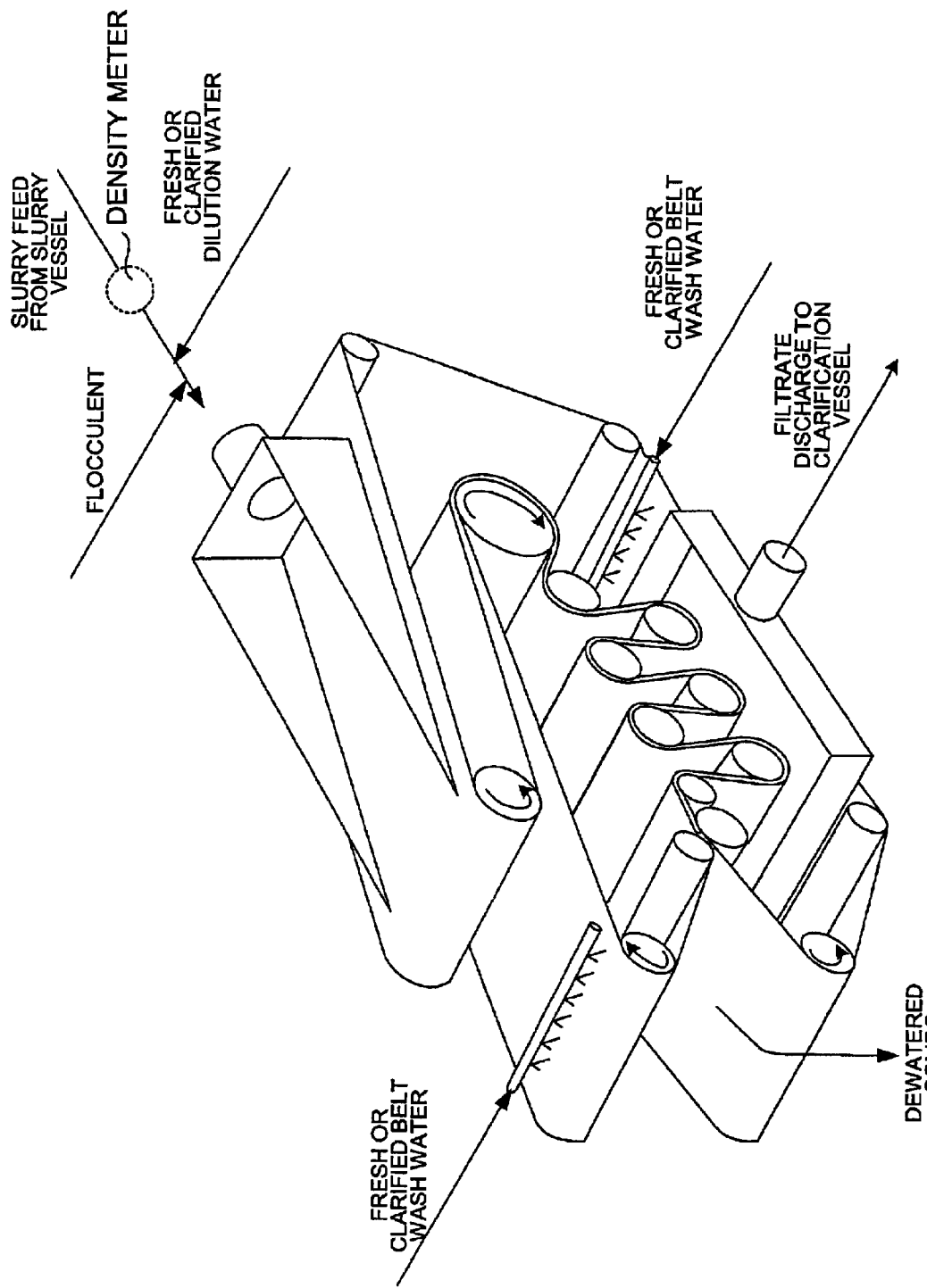

FILTER PRESS DILUTION

| VESSEL | GAL. CAP. | S.G. START | S.G. STOP | PRESS SIZE | PUMP GPM | PUMP HP | PUMP PSI | COMP CFM | COMP HP | COMP PSI | CYCLE TIME-MIN 1ST | CYCLE TIME-MIN LAST | CYCLE TIME-MIN TOT. | NUMBER CYCLES | FOB COST PRESS | FOB COST PUMP | FOB COST COMP |
|---|---|---|---|---|---|---|---|---|---|---|---|---|---|---|---|---|---|
| EM20 | 5,000 | 1.25 | 1.03 | . | . | . | . | . | . | . | . | . | . | . | . | . | . |
| EM40 | 10,000 | 1.25 | 1.03 | . | . | . | . | . | . | . | . | . | . | . | . | . | . |

FIG. 9A

FILTER PRESS FILTRATE

| VESSEL | GALLON CAP. START | GALLON CAP. STOP | S.G. | PRESS SIZE | PUMP GPM | PUMP HP | PUMP PSI | COMP CFM | COMP HP | COMP PSI | CYCLE TIME-MIN | NO. CYCLES | TOTAL TIME MIN | FOB COST PRESS | FOB COST PUMP | FOB COST COMP |
|---|---|---|---|---|---|---|---|---|---|---|---|---|---|---|---|---|
| EM20 | 5,000 | 500 | 1.25 | . | . | . | . | . | . | . | . | . | . | . | . | . |
| EM40 | 10,000 | 1,000 | 1.25 | . | . | . | . | . | . | . | . | . | . | . | . | . |

FIG. 9B

BELT PRESS FILTRATE

| WIDTH METERS | CAP. | SLURRY FEED | | SLUDGE FEED | AVG. FEED TO E-M | INTER-MITTENT FEED TO E-M | FEED TO E-M | 3 HR FEED TO E-M CY | | 90% EMPTY VESSEL-MIN | | FOB COST BELT PRESS | COST/DAY POLYMER |
|---|---|---|---|---|---|---|---|---|---|---|---|---|---|
| | LB/HR | SG | GPM | LB/CY | CY/MIN | CY/MIN | CY/HR | EM20 | EM40 | EM20 | EM40 | | |
| 1.2 | 12,000 | 1.22 | 70 | 620 | 0.32 | 1 | 19.2 | 77 | 97 | 64 | 135 | . | . |
| 1.7 | 18,000 | 1.22 | 105 | 620 | 0.48 | 1 | 28.8 | 106 | 126 | 43 | 90 | . | . |
| 2.2 | 24,000 | 1.22 | 140 | 620 | 0.64 | 1 | 38.4 | 135 | 155 | 32 | 68 | . | . |

*FIG. 10*

CLOSED CIRCUIT MATERIAL UTILIZATION CHART FOR RETURNED CONCRETE

| WATER SOURCE | CODE | CONCRETE RECYCLE MACHINE | PLANT BATCH WATER | BELT PRESS | FILTER PRESS | POND | HYDRO CYCLONE | DENSITY CELL |
|---|---|---|---|---|---|---|---|---|
| FRESH | F | X | X | X | | | | X |
| CLARIFIED SLURRY | CS | X | | | | | | |
| CLARIFIED POND | CP | X | X | | | | | |
| SLURRY | S | | X | X | X | | X | X |
| DRAINAGE | D | | | | | X | | |
| FILTRATE | FT | | | | | X | | |
| RETURN CONCRETE | RC | X | | | | | | |

FIG. 11

EFFICIENT CONCRETE RECYCLING

CROSS-REFERENCE TO RELATED APPLICATION

This application claims the benefit of U.S. Provisional Application No. 60/271,547, filed Feb. 26, 2001, and entitled "EFFICIENT CONCRETE RECYCLING," which is hereby incorporated by reference herein.

BACKGROUND OF THE INVENTION

1. Field of the Invention

The present invention relates to concrete plants and, more particularly, to concrete recycling systems for concrete plants. 2. Description of the Related Art One conventional concrete recycling effort is to reclaim cement slurry. See, e.g., U.S. Pat. No. 4,226,542, which is incorporated herein by reference. More particularly, cement slurry reclamation techniques for concrete plants separate aggregate and coarse sand constituents from returned concrete mix and the remaining ingredients are stored in slurry form for possible consumption during a subsequent production day. Typically, returned concrete mix is dumped into an inlet hopper having a screw classifier for removing aggregate and coarse sand, and a weired channel enabling gravity flow of the water, cement fines and sand fines constituents into a slurry vessel. A motor agitates the slurry within the slurry vessel to prevent setting. Typically, the motor runs constantly while there is slurry in the slurry vessel. Unfortunately, conventional concrete recycling has various limitations or constraints that lead to inefficient recycling. The inefficiencies pertain, for example, to high energy consumption and unusable slurry or slurry water.

Thus, there is a need for improved approaches to perform concrete recycling.

SUMMARY OF THE INVENTION

Broadly speaking, the invention relates to an improved concrete plant design with robust recycling capabilities and high energy efficiency. The invention can be implemented in numerous ways and configurations. Several embodiments of the invention are discussed below.

According to one embodiment of the invention, a concrete recycling system includes at least: a slurry vessel that receives slurry provided from concrete being returned, the slurry vessel having an agitation device; a motor that drives the agitation device; and a control system that controls at least one of duration and frequency with which the motor drives the agitation device.

According to another embodiment of the invention, a method for recycling concrete includes at least the operations of: removing at least a portion of aggregates from the concrete, thereby leaving at least slurry; storing the slurry in a slurry vessel, the slurry vessel having an agitation element driven by a motor; and agitating the slurry within the slurry vessel by driving the agitation element with the motor such that the energy used in performing the agitation is varied based on the load on the motor.

According to still another embodiment of the invention, a method for controlling a motor for agitating a cement slurry includes the operations of: activating the motor to agitate the cement slurry; monitoring a load on the motor during the activating; determining a suitable agitation duration based on the load; and deactivating the motor so as cease agitating the cement slurry after the suitable agitation duration has passed since the activating was initiated.

According to yet still another embodiment of the invention, a method for controlling a motor for agitating a cement slurry includes the operations of: monitoring density of the slurry density; determining a suitable agitation duration based on the density; and periodically activating the motor for the suitable agitation duration.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which:

FIGS. 4 and 5 pertain to a table of modules suitable for use with a batch plant.

FIG. 8 illustrates a representative continuous belt filter press according to one embodiment of the invention.

FIG. 9(a) illustrates representative performance information for a cyclic filter press operating in a dilution mode according to one embodiment of the invention.

FIG. 9(b) illustrates representative performance information for a cyclic filter press operating in a filtrate mode according to one embodiment of the invention.

FIG. 10 illustrates representative performance information for a continuous belt filter press according to one embodiment of the invention.

FIG. 11 is a diagram of a table showing how various water sources available in a concrete plant can be utilized according to one embodiment of the invention.

DETAILED DESCRIPTION OF THE INVENTION

The invention pertains to an improved concrete plant design with robust recycling capabilities and high energy efficiency. The invention can be implemented in numerous ways and configurations. Several embodiments of the invention are discussed below.

Embodiments of the invention are discussed below with reference to FIGS. 1–11. However, those skilled in the art will readily appreciate that the detailed description given herein with respect to these figures is for explanatory purposes as the invention extends beyond these limited embodiments.

Figure 1:
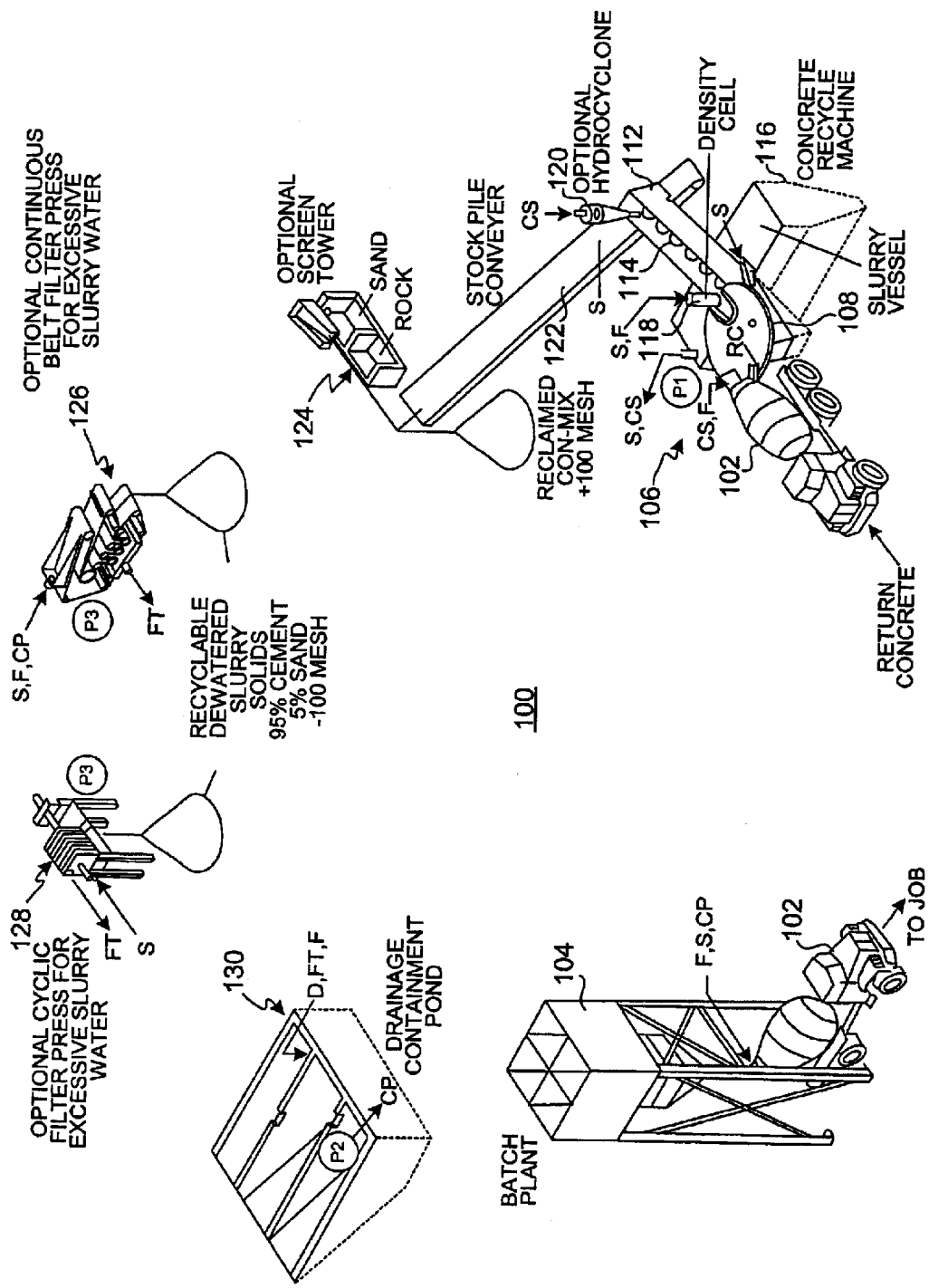
FIG. 1 is a diagram of a concrete plant according to one embodiment of the invention.

FIG. 1 is a diagram of a concrete plant 100 according to one embodiment of the invention. The concrete plant 100 receives a concrete truck 102 that requests an amount of concrete. The concrete truck 102 parks near a batch plant 104. The batch plant 104 produces concrete from water, sand and aggregate. The resulting concrete is then delivered to the concrete truck 102. Once the concrete truck 102 has received the desired concrete, the concrete truck 102 by proceeds to a job site where the concrete is utilized. It is very typical that the amount of concrete in the concrete truck 102 exceeds the amount of concrete needed for the job site. In such cases, the remaining (or left-over) concrete is then returned to the concrete plant 100 via the concrete truck 102.

At the concrete plant 100, the remaining concrete is then removed from the concrete truck 102 and provided to a concrete recycling machine 106. More specifically, the returned concrete is dumped in an solids reclaiming module 108. The solids (e.g., aggregate and sand) are separated from the slurry. The solids are then delivered to a solids conveyor 112. The solids conveyor 112 has a rotatable screw-like shaft that moves the solids away from the concrete recycling machine 106. The slurry is then fed to a slurry vessel 116 where the slurry remains until further utilized by the concrete plant 100. The slurry can be later recycled, de-watered or disposed of. The slurry vessel 116 is typically underground to save space. The density of the slurry in the slurry vessel can also be controlled. A density cell 118 can also be provided so that the density (namely, specific gravity) of the slurry can be examined. If desired, the slurry can be diluted to reduce the density of the slurry.

Optionally, a hydrocyclone 120 can also be provided adjacent the solids conveyor 112. The hydrocyclone 120 can be used to separate fine particles (e.g., sand) from the solids of the returned concrete on demand. In one embodiment, the hydrocyclone 120 uses centrifugal flow to separate out the fine particles.

The reclaimed solids (e.g., aggregate) being transported by the solids conveyor 112 are delivered to a lower region of a stockpile conveyor 122. The reclaimed solids are then conveyed by the stockpile conveyor 122 to a reclaimed concrete stockpile. An optional screen tower 124 can also be provided such that coarse and fine aggregates can be separated and thus separately stockpiled.

Optionally, to allow additional solids to be obtained from the slurry water, the concrete plant 100 can utilize a press which de-waters the slurry to obtain a usable, solid by-product. This by-product is well suited for use as fill material. The press can be of a variety of types and designs. In one embodiment, the press can be a continuous belt filter press 126. In another embodiment, the press can be a cyclic filter press 128. Although these filter presses 126 and 128 are optional, they are particularly useful when a large amount of concrete is being reclaimed or recycled and thus excessive slurry tends to be present.

The slurry within the slurry vessel 116 tends to settle and separate. The water that has separated from the slurry can be reused by the concrete plant 100 for various purposes (e.g., batching new concrete).

The concrete plant 100 also includes a drainage containment pond 130 which is provided within the concrete plant 100. The drainage containment pond 130 stores reclaimed water from the returned concrete either from the concrete recycling machine 108 or either of the filter presses 126 and 128. The water maintained in the drainage containment pond 130 can be reused as batch water for newly batched concrete, as makeup water for the concrete recycling machine 108, or as washout water used to wash out concrete from the batch plant 104 or the concrete truck 102.

As noted above, the continuous belt filter press 126 is particularly useful when large amounts of concrete are being reclaimed or recycled and thus excessive slurry tends to be present. According to one embodiment, the continuous belt filter press 126 operates as follows. When the density (specific gravity) of the slurry in the slurry vessel 116 increases to a threshold level (e.g., specific gravity=1.25), then the continuous belt filter press 126 can be activated to begin removal of the solids from the slurry. Note that the density cell 118 of the concrete recycling machine 108 can measure the specific gravity (S.G.) of the slurry within the slurry vessel 116. Once the continuous belt filter press 126 is activated, then the slurry from the slurry vessel 116 is directed to the continuous belt filter press 126. Prior to being processed, the slurry can be diluted, as appropriate, for the continuous belt filter press 126. In particular, a density meter (or mass flow meter) can measure the specific gravity of the incoming slurry (see FIG. 6). The slurry can be diluted with water (e.g., fresh water or clarified water from the drainage containment pond 130) so that the specific gravity is maintained within a range suitable for the continuous belt filter press 126. The slurry (following dilution, if any) is then processed by the continuous belt filter press 126 to remove solids from the slurry. The results are a usable, solid by-product and filtrate. The solid by-product is stockpiled for subsequent use (e.g., as a fill material). The filtrate is delivered to the drainage containment pond 130. The continuous belt filter press 126 can operate as desired. Typically, the continuous belt filter press 126 runs until the slurry vessel 116 is empty or until the slurry in the slurry vessel 116 has been substantially diluted.

FIG. 8 illustrates a representative continuous belt filter press according to one embodiment of the invention. The continuous belt filter press shown in FIG. 8 is, for example, suitable for use as the continuous belt filter press 126 illustrated in FIG. 1.

The cyclic filter press 128 is useful when large amounts of concrete are being reclaimed or recycled and thus excessive slurry tends to be present. The cyclic filter press 128, however, tends to be less efficient in removing solids from the slurry than the continuous belt filter press 126. The cyclic filter press 128 presses the filtrate from the slurry using a hydraulic action. The cyclic filter press 128 can operate in a dilution mode or a filtrate mode. In the dilution mode, the resulting filtrate is returned back the slurry vessel 116. Here, the slurry is being diluted because solids are being removed by the cyclic filter press 128. In the filtrate mode, the filtrate is delivered to the drainage containment pond 130.

FIG. 9(*a*) illustrates representative performance information for a cyclic filter press operating in a dilution mode according to one embodiment of the invention. In the dilution mode, the specific gravity (S.G.) controls the start and stop of the cyclic filter press. FIG. 9(*b*) illustrates representative performance information for a cyclic filter press operating in a filtrate mode according to one embodiment of the invention. In the filtrate mode, the amount of slurry in the slurry vessel controls the start and stop of the cyclic filter press. FIG. 10 illustrates representative performance information for a continuous belt filter press according to one embodiment of the invention. Here, Enviro-Matic (or "E-M") refers to brand of a concrete recycling machine according to one embodiment of the invention. The Enviro-Matic brand concrete recycling machine is available from Stephens Manufacturing Co. of Tompkinsville, Ky.

Figure 2:
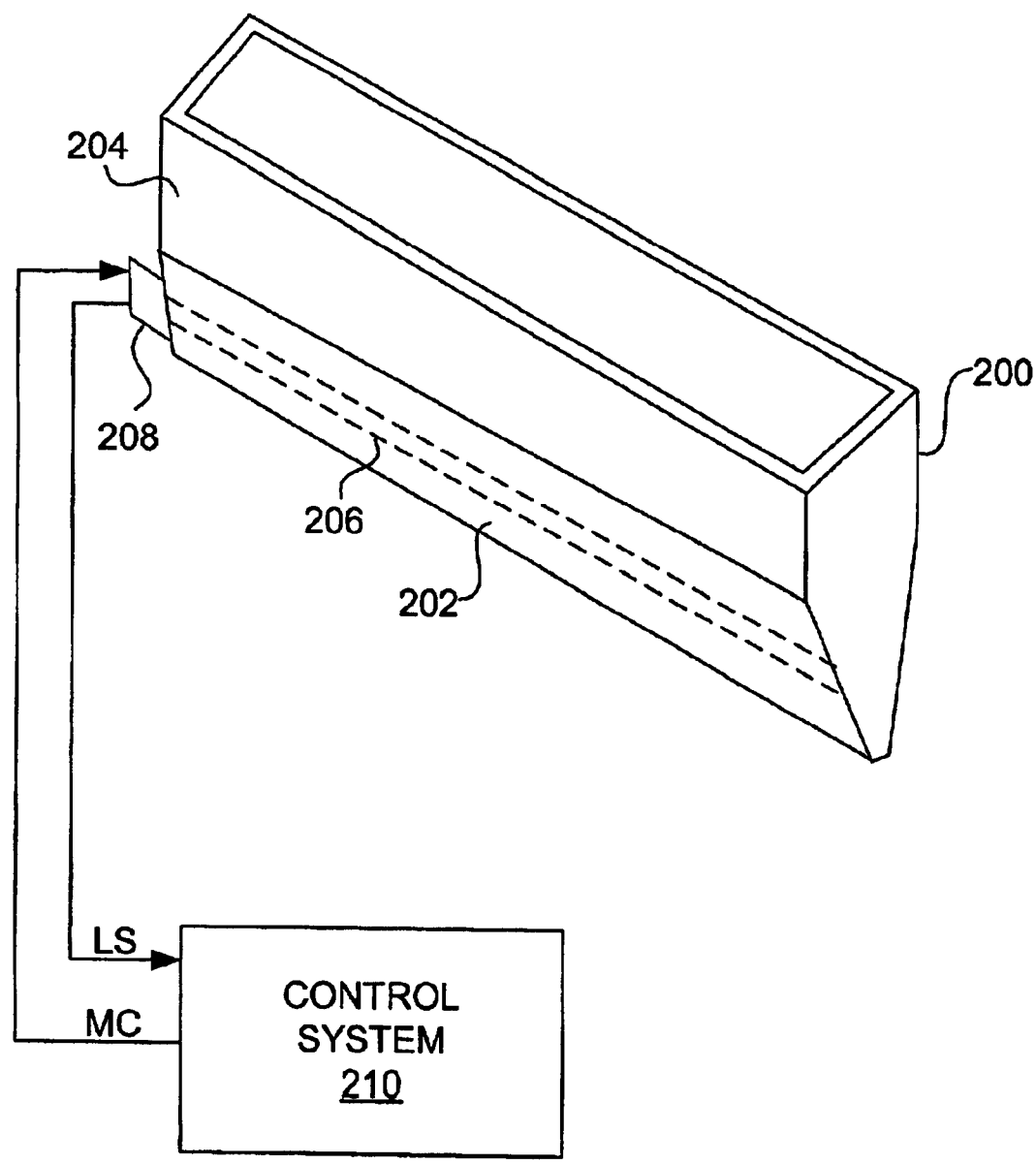
FIG. 2 is a block diagram of a portion of a concrete recycling machine according to one embodiment of the invention.

FIG. 2 is a block diagram of a portion of a concrete recycling machine according to one embodiment of the invention. The portion of the recycling machine an pertains to a slurry vessel 200. The slurry vessel 200 is, for example, suitable for use as the slurry vessel 116 shown in FIG. 1. In particular, FIG. 2 describes a system in which the slurry stored within the slurry vessel 200 can be agitated in an energy efficient manner such that the concrete remains unset and with appropriate density. The density of the slurry within the slurry vessel 200 can also be controlled as noted above. The slurry vessel 200 has a tapered lower portion 202 and an upper portion 204. The incoming slurry to the slurry vessel 200 is received at the upper portion 204 and settles down to the lower portion 202 due to gravity. The slurry vessel 200 can also have a lid (not shown) with an opening to receive the slurry and opening for incoming and outgoing water supply. The slurry vessel 200 is commonly, but not necessarily, buried underground. At the lower portion 202, the slurry vessel 200 includes an agitator device 206. The agitator device 206 serves to agitate the concrete slurry within the slurry vessel 200. The agitation device 206 is, for example, a paddle wheel. A motor 208 couples to the slurry vessel 200 to rotate the agitator device 206. The motor 208 is, for example, a 20 horsepower (hp) motor. A control system 210 is also provided to control the driving of the motor 208. Typically, the control system 210 can also control various other aspects associated with the concrete plant 100. In any case, the control system 210 receives a load signal (LS) from the motor 208. The load signal (LS) is used by the control system 210 to control when and how the agitator device 206 is driven by the motor 208. In this regard, the control system 210 sends motor control signals (MC) to the motor 208.

Figure 3:
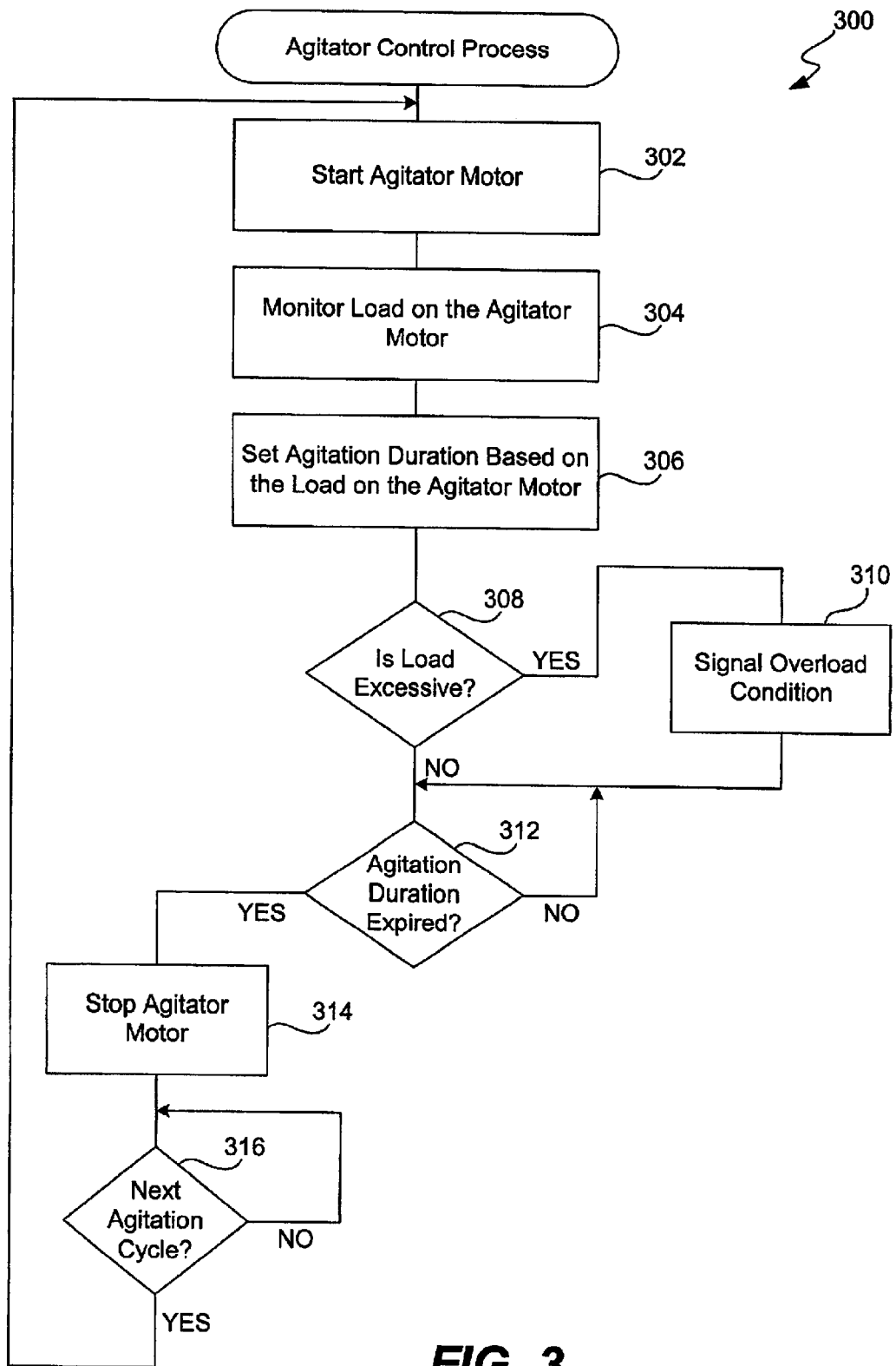
FIG. 3 is a flow diagram of an agitator control process 300 according to one embodiment of the invention.

FIG. 3 is a flow diagram of an agitator control process 300 according to one embodiment of the invention. In this embodiment, an agitator motor, such as the motor 208 illustrated in FIG. 2, is controlled to agitate concrete slurry residing in a slurry vessel of a concrete recycling system.

The agitator control process 300 initially starts 302 the agitator motor. At this point, agitation of the concrete slurry begins. Next, the load on the agitater motor is monitored 304. Typically, the load on the agitator motor is initially rather high when the agitator motor is first started. However, the load on the agitator motor soon thereafter returns to a steady-state position. The load at this point (i.e., the steady-state load) is the load preferably being monitored 304. Next, an agitation duration is set 306 based on the load on the agitator motor. The agitator duration represents the length of time during which the agitator motor is activated in any given cycle.

Additionally, the agitator control process 300 can also operate to monitor for excessive load conditions. In this regard, a decision 308 determines whether the load is excessive. When the decision 308 determines that the load is excessive, an overload condition can be signaled 310. Here, the overload condition can be signaled 310 in a variety of different ways. In one embodiment, the overload condition can be signaled 310 through use of an illuminated light appearing at an operator location. In another embodiment, the overload condition can be signaled 310 by initiating a dial-up modem sequence in which a remote maintenance location is notified, namely, its computer, that overload conditions are present at the concrete recycling system.

Following the operation 310, or following the decision 308 when the load is not excessive, a decision 312 determines whether the agitation duration has expired. When the decision 312 determines that the agitation duration has not yet expired, the agitator control process 300 awaits the expiration of the agitation duration. Once the decision 312 determines that the agitation duration period has expired, then the agitator motor is stopped 314. After the agitator motor has been stopped 314, a decision 316 determines a next agitation cycle. The agitation cycle (frequency) represents the duration of time between periods when the agitator motor is started 302. The agitation cycle can also be set and varied depending upon the load. Alternatively, the agitation cycle can be a fixed duration, such as one hour or thirty minutes. In any case, when the decision 316 determines that the next agitation cycle has arrived, the agitator control process returns to repeat the operation 302 and subsequent operations so that the agitation of the cement slurry can be repeated for this next agitation cycle.

The load can be monitored during each agitation cycle as suggested by the agitator control process 300 shown in FIG. 3. Alternatively, the load can be determined or redetermined less frequently, such as periodically (e.g., after a number of agitation cycles have passed or based on a timer) or as needed (e g., after the monitored load changes significantly).

Table 1 below provides representative durations and cycles for agitation of concrete slurry based on the load, with the load categorized by low, medium and high ranges.

TABLE 1

| LOAD | DURATION/CYCLE |
| --- | --- |
| Low | 30 seconds/1 hour |
| Medium | 45 seconds/.75 hour |
| High | 60 seconds/.5 hour |

The load categories of low, medium and high can be defined based on a percentage of full motor load rating for the agitation motor. In one example, "low" means the monitored load is less than 60% of full motor load rating, "medium" means the monitored load is between 60% and 80% of full motor load rating, and "high" means the monitored load is above 80% of full motor load.

Although the agitator control process 300 monitors the load on the agitator motor during agitation of the slurry in determining agitation duration and/or frequency, it should be noted that the agitation control process could instead monitor density of the slurry, and use the density in determining agitation duration and/or frequency.

The ability to control agitation parameters, such as duration and/or frequency, enables the agitation motor to run less often than it conventionally would run. Given the energy consumption of the agitation motor, this ability to provide controlled agitation leads to substantial cost savings.

FIGS. 4 and 5 pertain to a table of modules suitable for use with a batch plant, such as the batch plant 104 illustrated in FIG. 1.

Figure 6:
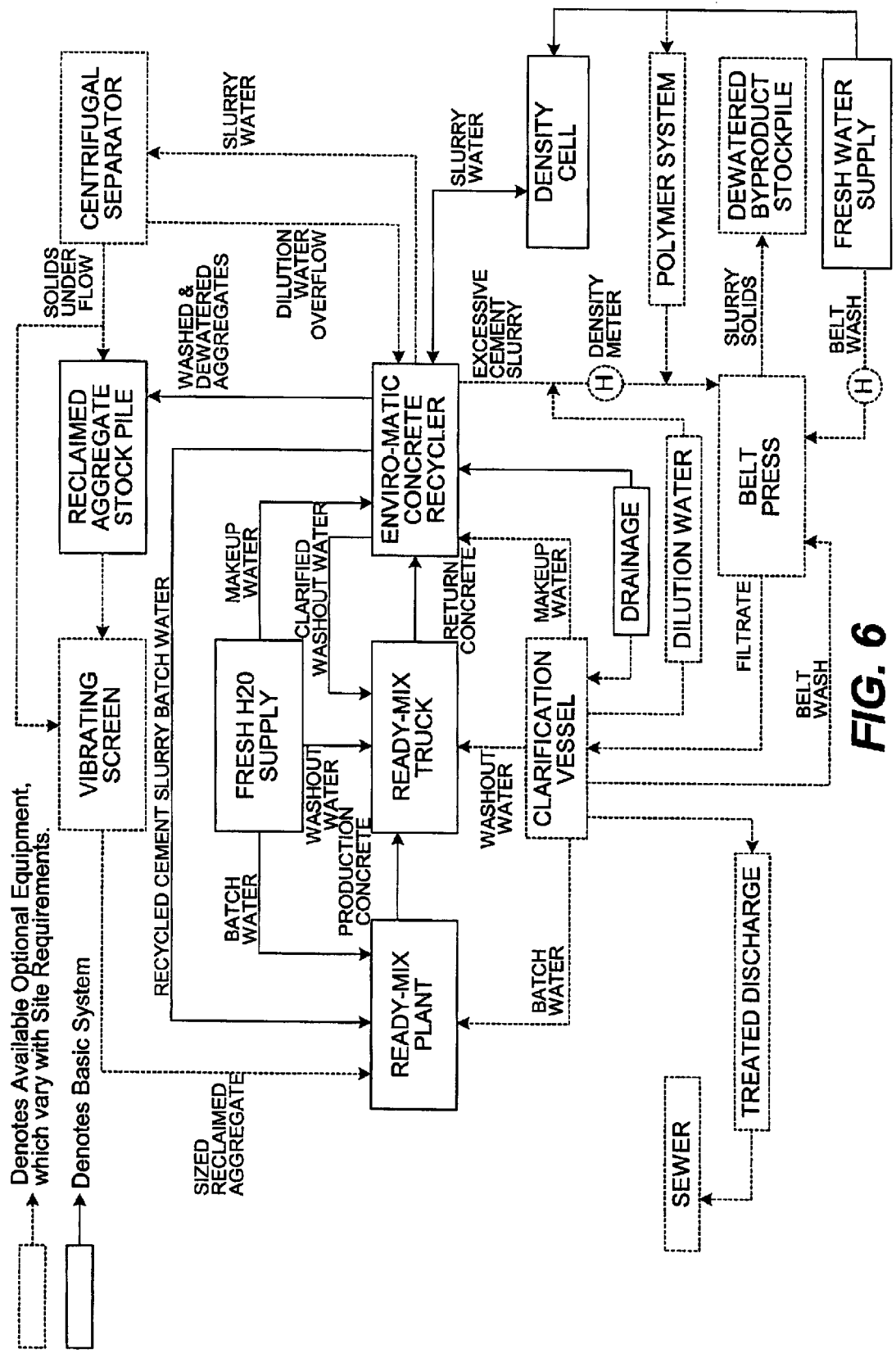
FIG. 6 is a diagram of a concrete recycling system according to one embodiment of the invention.

FIG. 6 is a diagram of a concrete recycling system according to one embodiment of the invention. The concrete recycling system shown in FIG. 6 optionally includes a belt press for removal of solids from concrete slurry.

Figure 7:
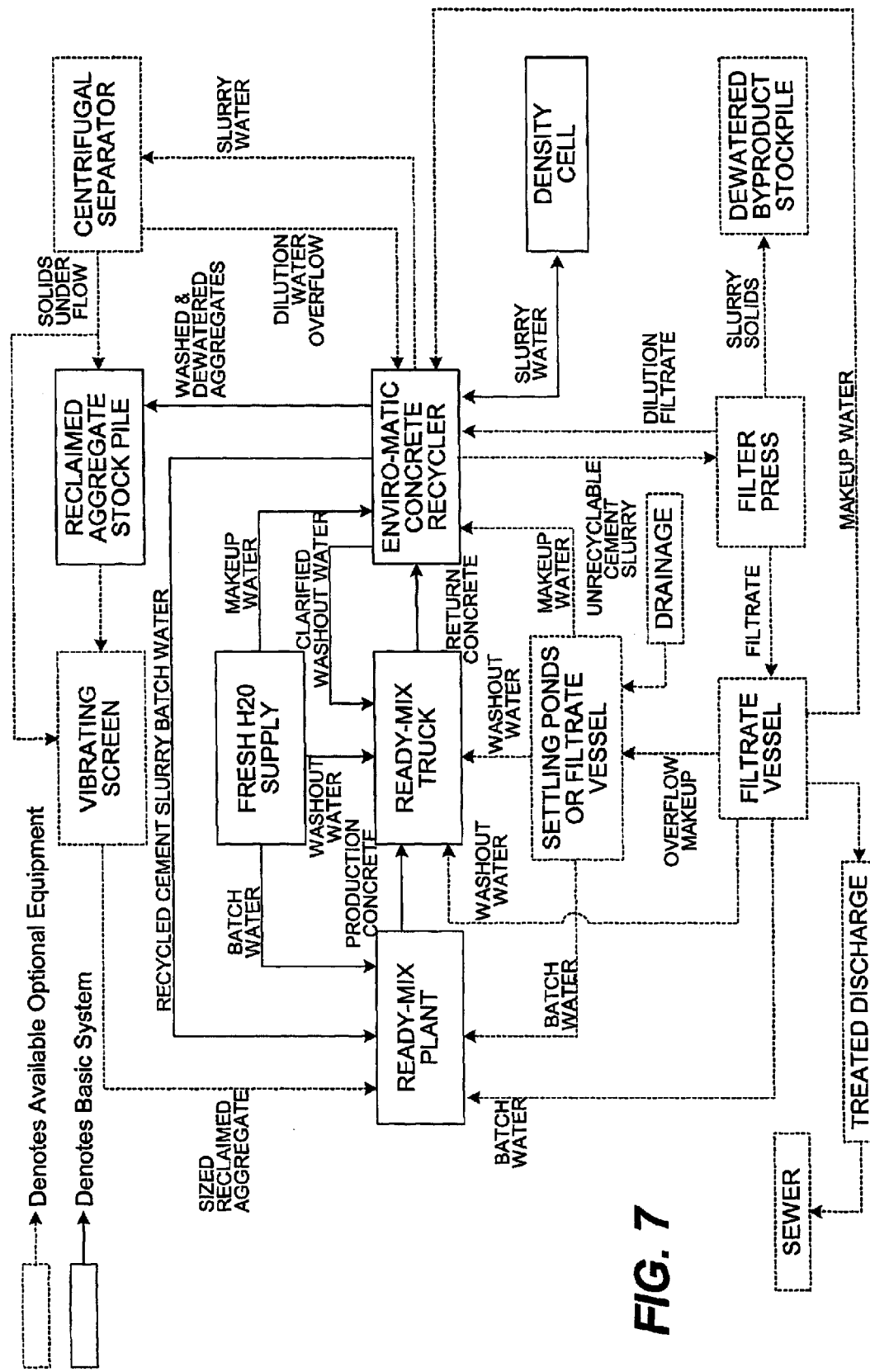
FIG. 7 is a diagram of a concrete recycling system according to another embodiment of the invention.

FIG. 7 is a diagram of a concrete recycling system according to another embodiment of the invention. The concrete recycling system shown in FIG. 7 optionally includes a filter press for removal of solids from concrete slurry.

The concrete plant according to the invention can have a closed-system design in which not only can a solid slurry by-product be reused but the water can also be recycled for reuse. Hence, the concrete plant can be environmentally friendly while also able to reduce production costs by substantially reducing waste. FIG. 11 is a diagram of a table showing how various water sources available in a concrete plant can be utilized according to one embodiment of the invention.

The invention is preferably implemented in equipment or machinery, but can be implemented in equipment or machinery or a combination of such and software. Such software can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, optical data storage devices, and carrier waves. The computer readable medium can also be distributed over network-coupled computer systems so that the computer readable code is stored and executed in a distributed fashion.

The advantages of the invention are numerous. Different embodiments or implementations may yield one or more of the following advantages. One advantage of the invention is that agitation of concrete slurry within a holding vessel can be performed in an energy efficient manner. This improved energy efficiency can lead to substantial cost savings to concrete production facilities. Another advantage of the invention is that a slurry press can be used to de-water concrete slurry to produce a usable, solid by-product. This by-product is well suited for, use as fill material. Still another advantage of the invention is that a concrete plant can have a closed-system design in which water is recycled for reuse. Yet still another advantage of the invention is that the concrete plant design is modular to allow customization based on needs.

The many features and advantages of the present invention are apparent from the written description and, thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A concrete recycling machine, comprising:
    a slurry vessel that receives slurry provided from concrete being returned, said slurry vessel having an agitation device;
    a motor that drives the agitation device; and
    a control system that controls at least one of duration and frequency with which said motor drives the agitation device,
    wherein said control system monitors a load on said motor during said driving of the agitation device, and
    wherein said control system controls the duration that said motor drives the agitation device based on the load, and wherein the greater the load, the longer the duration that said motor drives the agitation device.

2. A concrete recycling machine as recited in claim 1, wherein the agitation device is a rotatable agitation device.

3. A concrete recycling machine as recited in claim 1, wherein at least one of duration and frequency with which said motor drives the agitation device is selected from; predetermined values based on the load.

4. A concrete recycling machine as recited in claim 3, wherein the predetermined values are stored in a data look-up table.

5. A concrete recycling machine as recited in claim 1, wherein said control system further determines whether the load exceeds an overload threshold, and signals an overload status the load exceeds the overload threshold.

6. A concrete recycling machine as recited in claim 5, wherein said control system illuminates an overload status light at a control or maintenance center when signaling the overload status.

7. A concrete recycling machine as recited in claim 5, wherein said control system automatically notifies a control or maintenance center when signaling the overload status.

8. A concrete recycling machines, comprising:
    a slurry vessel that receives slurry provided from concrete being returned, said slurry vessel having an agitation device;
    a motor that drives the agitation device; and
    a control system that controls at least one of duration and frequency with which said motor drives the agitation device,
    wherein said control system monitors a load on said motor during said driving of the agitation device, and
    wherein said control system controls the frequency with which said motor drives the agitation device based on the load, and wherein the greater the load, the greater the frequency with which said motor drives the agitation device.

9. A concrete recycling machine as recited in claim 8, wherein the agitation device is a rotatable agitation device.

10. A concrete recycling machine as recited in claim 8, wherein at least one of duration and frequency with which said motor drives the agitation device is selected from predetermined values based on the load.

11. A concrete recycling machine as recited in claim 10, wherein the predetermined values are stored in a data look-up table.

12. A concrete recycling machine as recited in claim 8, wherein said control system also controls the duration that said motor drives the agitation device based on the load.

13. A concrete recycling machine as recited in claim 12, wherein both the duration and frequency with which said motor drives the agitation device are selected from predetermined values based on the load.

14. A concrete recycling machine as recited in claim 13, wherein the predetermined values are stored in a data look-up table.

15. A concrete recycling machine as recited in claim 8, wherein said control system further determines whether the load exceeds an overload threshold, and signals an overload status the load exceeds the overload threshold.

16. A concrete recycling machine as recited in claim 15, wherein said control system illuminates an overload status light at a control or maintenance center when signaling the overload status.

17. A concrete recycling machine as recited in claim 15, wherein said control system automatically notifies a control or maintenance center when signaling the overload status.

* * * * *